United States Patent [19]
Knollman

[11] 3,963,957
[45] June 15, 1976

[54] LAMP POWER SUPPLY ARRANGEMENT FOR KEY TELEPHONE SYSTEM

[75] Inventor: Dieter John Henry Knollman, Arvada, Colo.

[73] Assignee: Bell Telephone Laboratories, Incorporated, Murray Hill, N.J.

[22] Filed: Nov. 7, 1974

[21] Appl. No.: 521,648

[52] U.S. Cl. .......................... 315/200 A; 179/81 C; 179/84 L; 307/252 N; 307/252 UA
[51] Int. Cl.² ................. H05B 37/00; H04L 11/14; H03K 17/68
[58] Field of Search ............... 179/81 C, 84 L; 307/252 N, 252 UA; 315/200 A, 210, 312

[56] References Cited
UNITED STATES PATENTS

| | | | |
|---|---|---|---|
| 3,335,291 | 8/1967 | Gutzwiller | 307/252 N X |
| 3,443,204 | 5/1969 | Baker | 307/252 UA X |
| 3,739,104 | 6/1973 | O'Neill | 179/81 C |

Primary Examiner—R. V. Rolinec
Assistant Examiner—Lawrence J. Dahl
Attorney, Agent, or Firm—H. R. Popper

[57] ABSTRACT

A lamp rate generator is disclosed which generates signals for controlling the illumination of key lamps at key telephone sets so that they may be illuminated at wink or flash rates. In addition, a "zero-crossing" signal is generated to determine the onset of conduction in a PNPN switch in the ungrounded side of the lamp power lead to ensure that the rise time of current delivered to the lamp load shall follow the rectified ac waveform of the power source. The circuit is most advantageously employed in time division PBXs which must be rendered secure against transient noise signals that could be induced by current surges having steep wave fronts.

10 Claims, 1 Drawing Figure

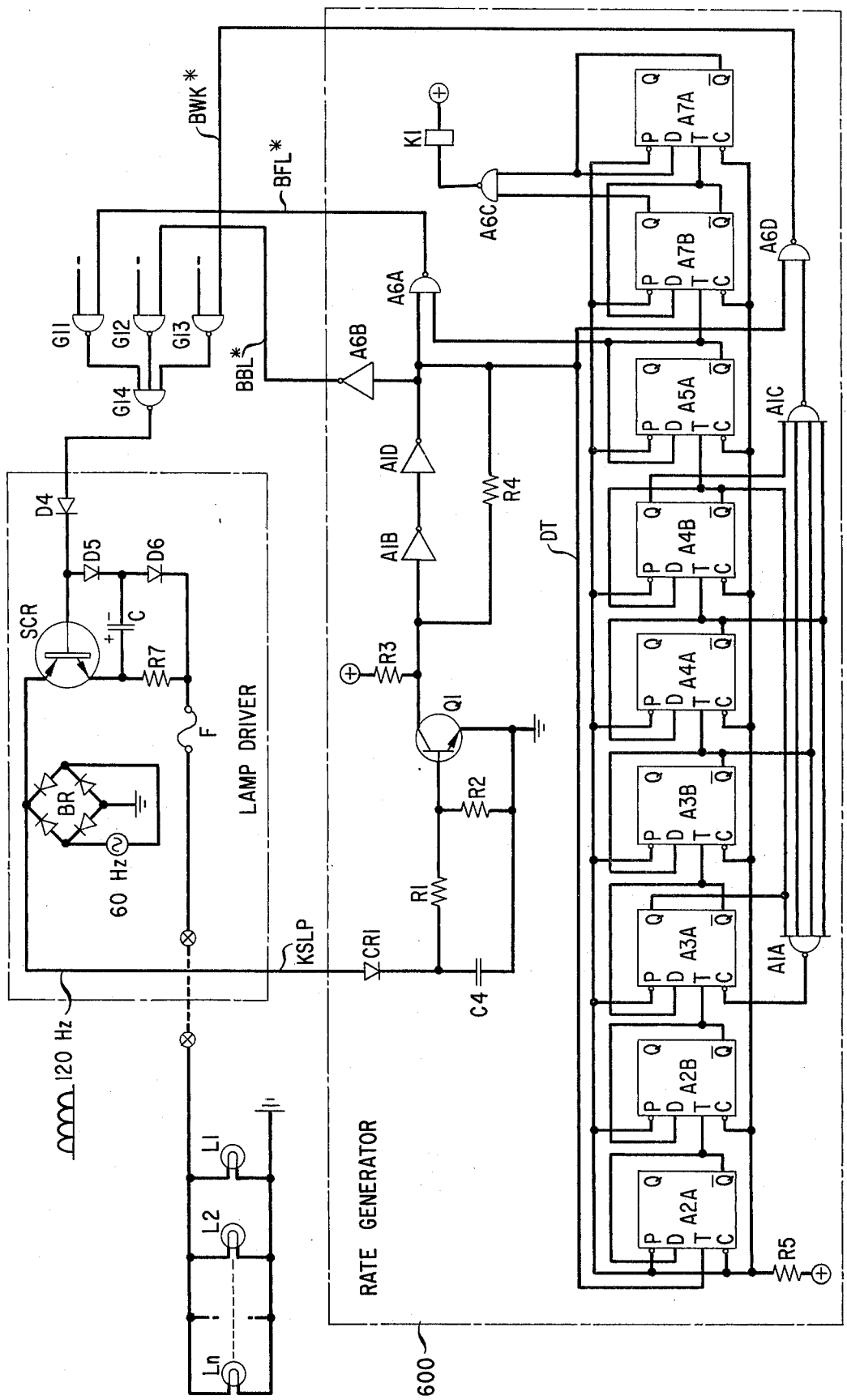

LAMP POWER SUPPLY ARRANGEMENT FOR KEY TELEPHONE SYSTEM

BACKGROUND OF THE INVENTION

This invention relates to key telephone systems and more particularly to the control of key lamp illumination at key telephone sets.

The conventional key telephone set is a telephone set that has pick-up key access to one or more central office lines and, usually also, a hold button for placing any of the lines in the holding state. Each key of such key telephone sets typically has an illuminating lamp which is driven at a distinctive rate by auxiliary equipment to display to the user the status of the associated line, line circuit, whether off-hook, ringing or on hold. The most frequently used lamp illumination rates are, of course, steady illumination to depict the off-hook and picked-up state of a line to which the key telephone set has access, the flashing rate to indicate that the line is ringing and the wink rate to indicate that the line is on hold.

In my copending application filed of even date herewith entitled "A Universal PBX Line Circuit for Key and Non-Key Service," there is described an electronic line circuit which is capable of serving a line of a key telephone set on an "integrated" or on a conventional basis. When connected on the integrated basis all of the usual key telephone services such as ring tripping, common hold bridging and distinctive lamp rate driving are performed as part of the line port circuitry. When connected on the conventional basis the circuit merely gives access to the tip and ring leads of the communications bus and if key service is desired the customer must use a conventional relay-type auxiliary key equipment such as the Western Electric 400D line circuit described in the R. E. Barbato U.S. Pat. No. 3,436,488. Thus, it would be desirable to permit customers who desired to obtain the old style key line service to have their station set buttons associated with these lines to be powered by conventional relay art lamp interrupters and to intermix such lines on the same key telephone set with other telephone lines served by the more modern electronic key line circuits of the aforementioned copending application.

It is the usual circuit practice when driving a load from an interrupting source to insert the interrupter circuit in the ground lead so that the usual solid state interrupter switch may be driven by a low voltage or so-called logic level driving signal.

It is the standard practice in supplying power to key set lamps, however, to ground one side of the lamp load at or near the station set and to supply interrupted power at flash or wink rates to the other side of the lamp. This precludes the insertion of a solid state driver in the ground lead and with it the convenience of using logic level signals in the base or gate element of the driver. When the switching element is placed in the high side of the lamp power supply lead, a further problem arises because as many as 20 line lamps may be associated with a given line circuit in a key system and may have to be driven at the same time. Such switching of the high side of the lamp load may introduce severe switching transients. In the ordinary step-by-step or crossbar PBX using metallic crosspoints in the talking path such lamp switching transients can usually be ignored. In a time division PBX, however, where solid state crosspoints are employed, it is feared that lamp switching transients could constitute an undesirable noise pollutant because the lamp interruption rates tend to fall within the voice communications band. I have devised an arrangement for delivering lamp rate power which is compatible with existing key system lamp wiring practices and which nevertheless holds lamp transients to a minimum.

As has been mentioned, the lamp illumination supply may have to drive one, five or up to twenty key lamps. Fusing of the lamp power supply is therefore troublesome since the load cannot be predicted at the factory and it would seem that field conditions must determine the appropriate power supply voltage. It would accordingly be advantageous to have a lamp illumination supply that could deliver distinctive lamp illumination rates to different types of lamp loads without requiring field readjustment of the supply whenever the load was changed.

SUMMARY OF THE INVENTION

The foregoing and other objects and features of my invention are achieved in the illustrative embodiment in which a solid state crosspoint switching device is installed in the "high side" of the lamp power lead but in which the rise time of the lamp illumination current, regardless of whether it is delivering power to the lamp load to provide steady illumination for active or "picked-up" lines, flash rate for illuminating lamps associated with ringing lines or wink rate for lamps associated with lines on hold.

In accordance with one aspect of the operation of my invention, I provide a "zero-crossing" detector for determining the instant at which the ripple voltage obtained by rectifying the a.c. mains voltage is at zero. At this instant, a solid state switch is permitted to commence delivering the rectified ripple voltage to the lamp load. The rise time of the lamp load current is thus caused to follow the wave shape of the ripple voltage. Since the power supply ripple voltage is derived from 60 Hz a.c. mains and is given full wave rectification, the lamp power supply voltage has a 120 Hz half-sinusoidal waveform. The rise time of the lamp current delivered to the load can therefore be no steeper than the rise time of the sinusoid. In addition since the solid state switch delivering power to the load in the illustrative embodiment is a silicon controlled rectifier (SCR) there can be no abrupt load current turn-off transient. Lamp load current is thus extinguished only when the a.c. power supply ripple voltage passes through zero.

In accordance with another aspect of the illustrative embodiment forming a part of my invention, I generate the control signals for defining the wink and flash rate intervals by counting transitions of the 120 Hz a.c. ripple voltage. The SCR switch is biased by the load current and connected in series with a fuse such that normal values of load current will permit normal SCR turn-on in response to the control signals provided at the zero-crossings. However, abnormal levels of load current, such as may be produced by an inadvertent short-circuit of the lamp load leads during installation or rearrangement of the key system, will produce a hold-over bias to delay SCR turn-on. The magnitude of the hold-over bias for certain high load currents may be sufficient to prevent SCR turn-on during more than one subsequent consecutive zero-crossing and is thereby capable of reducing the average value of load current to an acceptable level.

The foregoing and other objects and features of my invention may become more apparent by referring now to the drawing, the single FIGURE of which shows an illustrative embodiment.

Detailed Description

The rate generator of FIG. 1 operates as follows. One hundred twenty cycle full-wave rectified ripple voltage produced by full wave bridge rectifier BR from the 60 Hz source is applied to lead KSLP. Diode CR1 drops the voltage on leads KSLP by 0.7 volts and the R1-R2 divider applies approximately one-quarter of the voltage available at the cathode of diode CR1 to the base of transistor Q1. Accordingly, transistor Q1 which needs approximately +0.7 volts at its base for turn-on, will in fact, only be turned on when the voltage on lead KSLP exceeds 0.7 plus four times 0.7 volts or +3.5 volts. This reduces the pulse width required to achieve latching of the SCR driven by gate 14 as will hereinafter be explained.

When Q1 turns off, the high signal developed at its collector is shaped by the positive feedback squaring circuit comprising cascaded inverters A1B, A1D and feedback resistor R4 and is applied over lead DT as a positive going pulse to the toggle input T of D toggle flip-flop A2A.

The feedback squaring circuit is required because the TTL-type D flip-flops switch states rapidly compared to the slowly changing sinusoidal 120 Hz waveform. The squaring circuit thus provides a triggering signal to the T input of flip-flop A2A which has a finite rise time. The Q output of the D toggle flip-flop is switched to the state of the signal at the D input when a pulse is applied to the toggle input T. The D inputs of flip-flops A2A through A7A are each connected to the respective flip-flops Q outputs. The preset inputs P of flip-flops A2A to A7A are connected to positive battery through resistor R5 to prevent inadvertent presetting by negative impulses. The clear inputs C of each of the foregoing flip-flops, except flip-flop A3A, is also tied to positive battery to prevent inadvertent clearing.

Flip-flops A2A and A2B are connected in tandem so that flip-flop A2B delivers one pulse to the T input of flip-flop A3A for every four zero-crossing pulses applied to the T input of flip-flop A2A. When flip-flop A2A toggles, if its Q output had priorly been in the 0 state, the D input will have been conditioned to cause the flip-flop's Q output to switch to 0 and its Q output will toggle to 1. When the Q output of flip-flops A2A toggles to 1, flip-flop A2B toggles. If the Q output of flip-flop A2B had priorly been 0, its Q output will now be 1.

On the second zero-crossing pulse applied to the T input of flip-flop A2A, the D input is 1 and so the Q output toggles to 0. The 0 output of flip-flop A2A does not toggle flip-flop A2B.

On the third zero-crossing signal applied to the T input of flip-flop A2A, the D input is 0 so that Q output of flip-flop A2A becomes 1. The 1 output toggles flip-flop A2B. However, the D input to the flip-flop A2B is 1 so the Q output of flip-flop A2B is 0 when this flip-flop is toggled incident to the application of the third zero-crossing signal to the input of flip-flop A2A.

On the fourth zero-crossing impulse applied to flip-flop A2A, the D input is 1 so its Q output goes to 0. This, as before, is not effective to toggle flip-flop A2B.

On the fifth zero-crossing signal applied to flip-flop A2A, the D input is 0 so the Q output goes to 1. The 1 output toggles flip-flop A2B and since that flip-flop's D input is also 0, a 1 output appears at its Q output to toggle flip-flop A3A. Accordingly, flip-flop A3A has toggled once for every four zero-crossing pulses applied to flip-flop A2A.

Flip-flops A3A, A3B, A4A, and A4B are connected in cascade. On the first toggle impulse delivered to flip-flop A3A its Q output goes to 0 and its Q output goes to 1 thereby toggling flip-flop A3B. The Q output of flip-flop A3B toggles to 1 toggling flip-flop A4A whose Q output in turn toggles flip-flop A4B. Accordingly, at the end of the first pulse applied to flip-flop A3A, the Q outputs of flip-flops A3A through A4B are 1 1 1 1, respectively.

On the second toggle impulse delivered to flip-flop A3A, a 1 is present at its D input and so its Q output toggles to 0. This output does not propagate through the rest of the flip-flops so that at the end of the second toggle input, the Q outputs of the flip-flops are 0 1 1 1. Gate A1A is connected to the Q output of flip-flop A3A and to the Q outputs of flip-flops A3B, A4A, and A4B. Accordingly, at the end of the second toggle impulse, gate A1A receives an all 1s input and resets flip-flop A3A.

The resetting of flip-flop A3A causes a 1 signal to appear at its Q output which toggles flip-flop A3B to produce a 0 signal at its Q output. At the beginning of the third toggle impulse therefore the Q outputs of flip-flops A3A through A4B are in the state 1 0 1 1.

A summary of the flip-flop states of flip-flops A3A through A4B for each input pulse applied to the toggle input T of flip-flop A3A is as follows:

| Flip-Flop | | | | | | | | Outputs | Inputs to Gate A1A |
|---|---|---|---|---|---|---|---|---|---|
| A3A | | A3B | | A4A | | A4B | | | |
| D | Q | D | Q | D | Q | D | Q | Q Q Q Q | |
| 0 | 1 | 0 | 1 | 0 | 1 | 0 | 1 | 0 0 0 0 | 0 1 1 1 |
| 1 | 1 | 1 | 1 | 1 | 1 | 1 | 1 | 0 1 0 0 | 1 1 1 1 |
| 1 | 0 | 0 | 0 | 1 | 1 | 1 | 1 | 1 1 0 0 | 0 0 1 1 |
| 0 | 1 | 0 | 1 | 1 | 0 | 1 | 1 | 0 0 1 0 | 1 0 1 1 |
| 1 | 0 | 1 | 1 | 0 | 0 | 1 | 1 | 1 0 1 0 | 0 1 0 1 |
| 0 | 1 | 1 | 0 | 0 | 0 | 1 | 1 | 0 1 1 0 | 1 1 0 1 |
| 1 | 0 | 0 | 0 | 0 | 0 | 1 | 1 | 1 1 1 0 | 0 0 0 1 |
| 0 | 1 | 0 | 1 | 0 | 1 | 1 | 0 | 0 0 0 1 | 1 0 0 1 |
| 1 | 0 | 1 | 1 | 1 | 1 | 0 | 0 | 1 0 0 1 | 0 1 1 0 |
| 0 | 1 | 1 | 0 | 1 | 1 | 0 | 0 | 0 1 0 1 | 1 1 1 0 |
| 1 | 0 | 0 | 0 | 1 | 1 | 0 | 0 | 1 1 0 1 | 0 0 1 0 |
| 0 | 1 | 0 | 1 | 1 | 0 | 0 | 0 | 0 0 1 1 | 1 0 1 0 |
| 1 | 0 | 1 | 1 | 0 | 0 | 0 | 0 | 1 0 1 1 | 0 1 0 0 |
| 0 | 1 | 1 | 0 | 0 | 0 | 0 | 0 | 0 1 1 1 | 1 1 0 0 |
| 1 | 0 | 0 | 0 | 0 | 0 | 0 | 0 | 1 1 1 1 | 0 0 0 0 |
| 0 | 1 | 0 | 1 | 0 | 1 | 0 | 1 | 0 0 0 0 | 1 0 0 0 |

Gate A1A has its inputs connected to the Q output of flip-flop A3A and to the Q outputs of flip-flops A3B, A4A, and A4B and so is wired to detect the count 1 0 0 0. When this count is detected, gate A1A clears flip-flop A3A.

Accordingly, it is seen that the Q output of flip-flop A4B toggles from the 0 state to the 1 state after 15 pulses have been applied to the input of flip-flop A3A. Since an input is applied to A3A on every fourth zero-crossing, the output from flip-flop A4B, occurs once every sixtieth zero-crossing. Since the zero-crossings on lead KSLP are at the 120 Hz rate, the output of flip-flop A4B is a logic level trigger pulse every half second. This signal toggles flip-flop A5A every half second which in turn allows gate A6A to deliver half-seconds of 120 Hz zero-crossing signals to flash rate control lead BFL*.

Gate A1C is connected to the Q outputs of flip-flops A3A and A4B and to the Q outputs of flip-flops A3B and A4A and is consequently activated when flip-flops A3A through A4B are in the state 1 0 0 1, i.e., on the eighth zero-crossing following the enabling of gate A1A. When gate A1C has an all 1s input, its output forces the output of gate A6D high thereby generating the logic-level wink control signal on lead BWK*.

The logic level signal developed at the output of gate G14 is applied through diode D4 to the gate of silicon controlled rectifier SCR. The source electrode of the SCR is connected to lead KSLP on which there is applied half sinusoids at the 120 Hz rate as obtained from the full wave rectifier bridge BR. The drain electrode of the SCR is connected in series with resistor R7 to the lamp load.

Whenever the output of gate G14 is in the logic 1 state and the SCR is off, current will flow from gate G14 through diode D4 and the gate-cathode junction of the SCR and resistor R7 in parallel with diodes D5 and D6 and thence through the lamp load. The SCR gate current will trigger regenerative action internal to the SCR and turn the SCR on. Load current will now flow from the 120 Hz supply through the SCR source and drain electrodes to the lamp load. When the lamp voltage exceeds 4 volts, gate diode D4 will become reverse-biased to protect logic gate G14 from lamp voltages.

Resistor R7 limits the current through the SCR. The voltage developed across resistor R7 is a function of the load current. Capacitor C attempts to charge to the peak value of the voltage developed across R7 which is proportional to the load current. Capacitor C charges through diode D6.

The internal resistance of diode D6 is a function of the voltage across it. For voltages less than about 0.3 volts the resistance is very large and negligible charge is produced in capacitor C. As the voltage across R7 increases, the voltage across diode D6 increases, its internal resistance decreases, and more charge is produced across the capacitor C. This non-linear relationship creates a sharp threshold.

The voltage across C is clamped by diode D5 to the difference between the gate-cathode voltage of the SCR and the forward voltage of diode D5 and D6. For example, assume that a short circuit load exists and that the SCR has been turned on by a gate trigger pulse. Diodes D5 and D6 clamp the gate voltage to a value less than 2 diode drops (approximately 1.4 volts). The gate clamping will draw current out of the gate, cause the SCR to come out of saturation, and limit the short circuit current. The charge on capacitor C produced by the value of the load current establishes a negative bias on the gate element of the SCR.

the 1 signal when present at the output of gate 14 attempts to turn on the SCR only during the zero-crossings of the 120 Hz supply. The source resistance of gate G14 in the logic 1 state limits the charging (discharging) of capacitor C. Assuming that the turn-on voltage of the SCR is approximately equal to the voltage drop in diode D5, it is apparent that the SCR cannot turn on until the bias voltage developed across capacitor C is substantially zero. With only a small charge on capacitor C, the zero-crossing pulse output from gate G14 can fully discharge capacitor C and thereby turn on the SCR. With a large negative charge on capacitor C, however, several zero-crossing pulse outputs from gate G14 will be required to discharge capacitor C sufficiently and the SCR will thus remain off for these half-cycles of the power supply voltage on lead KSLP.

For example, let it be assumed than an overload condition exists and that capacitor C has been charged such that ten pulses from gate G14 would be required to discharge it. Under these circumstances the SCR can be turned on only every tenth half-cycle of the 120 Hz supply. This determines that the average current through the SCR can only be one-tenth of the peak current.

In the illustrative embodiment it may be noted that peak current is limited by resistor R7, the SCR drop, and the load. For example, then the ripple supply at the 120 Hz rate is of magnitude 11 volts rms the use of an SCR having an internal drop of 1 volt (and neglecting the effect of gate clamping) and a resistor R7 having a resistance of 1 ohm, the peak short-circuit current is ten amperes. Under short-circuit load conditions, as might be occasioned by a wiring error or damage to the cable out to the key telephone sets, the average current through the SCR will be far less than the peak since the charge developed on capacitor C by the instantaneous peak short-circuit current will prevent the SCR from turning on for a number of subsequent half-cycles of the 120 Hz supply.

In one illustrative embodiment of the invention, diodes D4, D5, and D6 were of the Western Electric 458C type, SCR was an RCA 107Y1 sensitive-gate, silicon controlled rectifier, resistor R7 had a value of 1 ohm, capacitor C had a value of 100 UF. The 120 Hz supply had an amplitude of 12 volts rms and a variable number of type 51A lamps were employed. Circuit operation was satisfactory with up to a ten lamp load. Increasing the value of R7 to 1.4 ohm dropped the current limit to six lamps. The circuit exhibited a sharp threshold so that the addition of a single additional lamp load at the threshold produced limiting in all cases to a value below 0.2 times the threshold current. Tests were also conducted in which the internal resistance of gate G14 was varied and it was found that increasing the internal resistance of the gate increased the number of half-cycles and hence decreased the average overload current.

In the illustrative embodiment, a sensitive-gate SCR (RCA 107Y1) was chosen to simplify the logic interface circuit. It should be understood that a standard reverse-blocking thyristor could have been employed at the expense of a somewhat more complicated interface circuit. It has been found that transistors cannot be successfully substituted for the SCR because under surge conditions, i.e., short-circuit of the lamp load, transistors come out of saturation, increase the internal power dissipation and tend to destroy themselves before fuse F blows. The use of the SCR avoids operation in the nonsaturated region of the characteristic due to the internal regenerative action and it has thus been found practical to protect the SCR with the use of fuses. In order to protect the SCR against extreme overload conditions, the fuse F must blow before the surge rating of the SCR is exceeded. While commercially-available fuses are not accurately specified with respect to surge ratings, only "typical" surge data is generally available, and while the SCR surge ratings are not specified for full-wave operation, it has been found that employing even the slowest of three commercially-available fuse types under extreme short-circuit conditions the fuse F was found to blow before the SCR was destroyed. It is recognized however, that continual surge testing of thyristors reduces the device lifetime, but such abuse is not to be normally expected in telephone installations.

Accordingly, I have described a practical lamp rate generator with current regulated supply that is compatible with existing key station set lamp wiring practices, which regulates lamp load current over the range of normally expected variation in the number of lamps to be driven and which introduces to transient noise impulses into the associated time division communications bus of the key system in which it may be employed.

Under normal conditions the current limiting feature will prevent the fuse from blowing and maintain safe SCR operation even under circuit conditions. The fuse is thus employed as an additional safety precaution in the rare instance that a failure in the current limiting circuit might arise.

What is claimed is:

1. A lamp rate generator for driving a load including a variable number of key line lamps without abrupt current changes, comprising
   a source of unfiltered full-wave half-sinusoids,
   means for detecting zero-crossings of said half-sinusoids,
   means for counting predetermined numbers of said zero-crossings,
   SCR means having its source and drain electrodes interposed between said source and said lamp load, and
   means controlled by said counting means for delivering control signals to the gate electrode of said SCR in synchronism with said zero-crossings.

2. A lamp rate generator according to claim 1 further comprising
   resistance means in circuit between said drain electrode and said lamp load,
   means for sensing the peak current through said resistance means, and
   means for applying a bias to said gate electrode poled to counteract said control signals.

3. A lamp rate generator according to claim 2 wherein said peak current sensing means includes capacitor means connected to said resistance means and developing a predetermined charge therefrom responsive to current flow therethrough and wherein a predetermined number of said control signals is required to overcome said predetermined charge.

4. A lamp rate generator according to claim 1 wherein said zero-crossing detecting means includes
   an input gate connected to said source,
   threshold setting means for said input gate, and
   regenerative feedback means at the output of said gate.

5. A rate generator for surgelessly delivering to a remotely-grounded load a plurality of current supply signals having predeterminable periodicity, comprising
   a current source having substantially half-sinusoidal voltage waveform,
   semiconductor switching means having its source and drain electrodes interposed between said current source and said load, said switching means having a controllable gate electrode,
   means for sensing the current being delivered through said semiconductor switching means to said load, and
   means controlled by said sensing means for selectively driving said gate electrode in inverse relationship to the magnitude of said current detected by said sensing means commencing only when the magnitude of said source voltage waveform is less than a predetermined value.

6. A rate generator according to claim 5 wherein said current source half-sinusoidal voltage waveform is substantially full wave half-sinusoidal and wherein said means for driving said gate electrode includes
   means for detecting the zero amplitude moments of said waveform.

7. A rate generator according to claim 6 wherein said gate electrode driving means includes counting means connected to said detecting means for counting a predetermined number of said zero amplitude moments.

8. A rate generator according to claim 6 wherein said means for driving said gate electrode includes a logic level gate connected to said gate electrode, a source of pulse signals having said predeterminable periodicity, said periodicity being a submultiple of said half-sinusoidal waveform, and means controlled by said detecting means for enabling said gating means to connect said pulse signals source to said gate electrode.

9. A rate generator according to claim 8 wherein said means for sensing comprises
   means connected between said drain and said gate electrodes for applying a reverse bias at said gate electrode proportional to the magnitude current delivered to said load.

10. A rate generator according to claim 9 wherein said means includes a resistor connected between said drain and said load,
    a pair of diodes serially connected between said gate and drain electrodes and
    capacitor means connecting said drain electrode with a pair of diodes.

* * * * *